United States Patent
Breuer et al.

(10) Patent No.: US 11,202,203 B2
(45) Date of Patent: Dec. 14, 2021

(54) METHOD FOR SECURING A DIRECT COMMUNICATION CONNECTION

(71) Applicant: THALES DIS AIS Deutschland GmbH, Munich (DE)

(72) Inventors: Volker Breuer, Boetzow (DE); Lars Wehmeier, Falkensee (DE); Osaid Khaliq, Berlin (DE); Thomas Ulrich, Bad Dürkheim (DE); Uwe Dummann, Panketal (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 0 days.

(21) Appl. No.: 16/754,791

(22) PCT Filed: Oct. 2, 2018

(86) PCT No.: PCT/EP2018/076861
§ 371 (c)(1),
(2) Date: Apr. 9, 2020

(87) PCT Pub. No.: WO2019/072657
PCT Pub. Date: Apr. 18, 2019

(65) Prior Publication Data
US 2020/0304994 A1     Sep. 24, 2020

(30) Foreign Application Priority Data
Oct. 13, 2017 (EP) ..................................... 17196393

(51) Int. Cl.
*H04W 12/06* (2021.01)
*H04W 76/14* (2018.01)
(Continued)

(52) U.S. Cl.
CPC ............ *H04W 12/06* (2013.01); *H04L 9/3268* (2013.01); *H04L 63/0823* (2013.01); *H04L 63/18* (2013.01); *H04W 76/14* (2018.02)

(58) Field of Classification Search
CPC ......... H04L 12/4625; H04L 2012/2841; H04L 2209/84; H04L 63/0823; H04L 63/18;
(Continued)

(56) References Cited

U.S. PATENT DOCUMENTS

| 2011/0083011 A1 | 4/2011 | DiCrescenzo |
| 2015/0163217 A1* | 6/2015 | Lo ....................... G06F 17/3053 726/6 |

(Continued)

FOREIGN PATENT DOCUMENTS

| WO | 2013143144 A1 | 10/2013 |
| WO | 2017107043 A1 | 6/2017 |

OTHER PUBLICATIONS

International Search Report (PCT/ISA/210) dated Oct. 31, 2018, by the European Patent Office as the International Searching Authority for International Application No. PCT/EP2018/076861.

(Continued)

*Primary Examiner* — Quoc Thai N Vu
(74) *Attorney, Agent, or Firm* — Buchanan Ingersoll & Rooney PC

(57) ABSTRACT

A method for securing a direct communication connection between a first and a second user equipment, both configured to operate with base stations of a wireless network, in which the first user equipment maintains an authentication code received from a first security center accessible via the wireless network, said first security center being assigned to a first area, the method comprising the steps for the first user equipment of: maintaining a trust level of the authentication code, reducing the trust level relating to the time of last (Continued)

access to one of the base stations of the wireless network, submitting to the second user equipment the authentication code and the trust level, for setting up the direct communication connection, and in case of reception of a confirmation transmission from the second user equipment: setting up the direct communication connection with the second user equipment.

15 Claims, 3 Drawing Sheets

(51) Int. Cl.
*H04L 9/32* (2006.01)
*H04L 29/06* (2006.01)

(58) Field of Classification Search
CPC . H04L 9/3268; H04L 63/0807; H04L 63/061; H04L 63/0876; H04L 9/3213; H04L 63/062; H04L 67/104; H04L 9/3273; H04W 12/04; H04W 12/06; H04W 4/40; H04W 76/14; H04W 4/70; H04W 12/02; H04W 12/50; H04W 12/66; H04W 12/03; H04W 12/065; H04W 12/08; G06F 2211/009

See application file for complete search history.

(56) References Cited

U.S. PATENT DOCUMENTS

| | | | |
|---|---|---|---|
| 2015/0242605 A1* | 8/2015 | Du | G06F 21/32 726/7 |
| 2016/0004871 A1 | 1/2016 | Guedalia et al. | |
| 2016/0156593 A1* | 6/2016 | Yan | H04L 9/3239 726/4 |

OTHER PUBLICATIONS

Written Opinion (PCT/ISA/237) dated Oct. 31, 2018, by the European Patent Office as the International Searching Authority for International Application No. PCT/EP2018/076861.

* cited by examiner

METHOD FOR SECURING A DIRECT COMMUNICATION CONNECTION

FIELD OF THE INVENTION

The present invention relates to a method for securing a direct communication connection. The invention also pertains to a user equipment using said method.

BACKGROUND OF THE INVENTION

In the field of wireless communication a big new communication use case is dawning, which is the so-called "vehicle to everything" (V2X) communication. It relates in a broader sense to communication of vehicles with other communication partners, in particular other vehicles (V2V). This use case is basically the backbone for a real autonomous driving architecture, comprising exchange between vehicles regarding unexpected situations as well as with roadside equipment like beacons, e.g. for exchanging information like dynamic speed limits, deviations etc. Technically the concept comprises a direct communication between the vehicle and the "X", instead of a communication via wireless network base stations. In the current ETSI specifications of the cellular communication standard this technology is called "Sidelink", "D2D", or "ProSe".

One major issue with this communication is to implement a strong security in order to avoid any hacking, false information, alarms etc. The whole concept is only reliable and accepted when such security measures are assured. As a matter of fact, securing wireless communication is a well-known task, with sufficient long keys and reliable encryption standards communication is secured already today. However for V2X communication the requirements are somehow different.

Various means for securing V2X communication, that take into account both the timing issue and avoid tracking of the vehicles are currently under discussion. They all have in common that it is necessary to contact a security center or other entity via the wireless network before the direct communication connection is ready to be established. One example of such solutions is described in EP17187276.5 (not published yet), filed by the applicant. No solutions are however known in the prior art how to cope with the situation that a direct communication connection between a vehicle and another equipment is intended to be setup in an area where at least one of the communication partners has no access to wireless networks. Although high coverage rates are announced by network providers, these mainly relate to the population, that means where people live. In the country side, such coverage rates are merely matched. In the discussion of switching off legacy networks (2G, 3G) for bringing 5G networks in the field, the situation might even get worse.

On the other hand V2X use cases are not bound to inhabited areas. When it is thought about autonomous driving with V2V communication as a backbone technology, this is by far not spatially limited to such areas.

It is therefore the goal of present invention to propose a solution for an improved securing of the direct communication channels between two user equipments, which is also usable in a non-coverage area.

Further alternative and advantageous solutions would, accordingly, be desirable in the art.

SUMMARY OF THE INVENTION

For this it is according to a first aspect of the invention suggested a method for securing a direct communication connection between a first and a second user equipment according to claim 1. It is further suggested according to a second aspect of the invention a user equipment according to claim 11.

According to the first aspect of the invention it is proposed a method for securing a direct communication connection between a first and a second user equipment, both configured to operate with at least one of a plurality of base stations of a wireless network, the first user equipment maintaining an authentication code received from a first security center accessible via the wireless network, said first security center being assigned to a first area, the method comprising the steps for the first user equipment of:

maintaining a trust level of the authentication code,
reducing the trust level relating to the time of last access to one of the base stations of the wireless network,
submitting to the second user equipment the authentication code and the trust level, for setting up the direct communication connection, in case of reception of a confirmation transmission from the second user equipment:
setting up the direct communication connection with the second user equipment.

The inventive method relates to direct communication connections between two user equipments. Such user equipments are configured to operate with a wireless, in particular cellular wireless network, such as 2G, 3G, 4G etc., or a combination thereof. The user equipments comprise transceiver circuitry for contacting base stations of the wireless network over the air interface. Further such user equipments comprise a secured storage area for network access credentials, in particular in a removable or embedded subscriber identity module, resp. a UICC.

While for securing the communication between the user equipments and the wireless network's base station sufficiently means are available, this is not the case for direct communication connections between user equipments.

Such direct communication connections in particular relate to new technologies encompassed under the term device-to-device communication. In cellular technology standards for such device-to-device communication this is covered by the so-called ProSe technology, which makes use of a Sidelink channel structure.

It is commonly acknowledged that the ProSe communication makes use of the same authentication and authorization methods as regular wireless communication. However, this is not sufficient for movable user equipments like in cars, which want to communicate when passing by, e.g. for warning of danger situations etc., which is seen as one of the backbones of autonomous driving. It requires at least faster methods for securing the device-to-device communication, which moreover fulfills data privacy concerns, as drivers do not want to be tracked.

For that the inventive method suggests that a user equipment which is planning to setup a direct communication connection to another user equipment maintains a first authentication code. This authentication code is received from a first security center, which is accessible via the wireless network. The basic procedure complements to the teachings of EP17187276.5, mentioned before. For solving the situation of setting up a direct communication connection between the first and a second user equipment in remote areas, where no wireless network coverage is available, the inventive solution proposes for the user equipment to maintain a trust level of the authentication code.

Such trust level is a value that is designated to indicate how trustworthy the authentication code is. Preferably this value is a percentage value or a discrete value in a range from 0 or 1 to x, with x meaning the highest possible trustworthiness.

The trust level is supposed to be continuously reduced, whereby the reduction of the trust level is a function at least of time since last access to a base station of the wireless network, resp. a security center of the wireless network by means of the base station.

In other words, when the user equipment accesses a base station resp. a security center, be it for updating its list of authentication codes or for other purposes, then the trust level is set to the maximum value of trustworthiness. Alternatively the trust level is increased by a given value with each access until the maximum value is achieved.

For setting up a direct communication connection with a second user equipment in proximity of the first user equipment, it submits the authentication code and the trust level to the second user equipment. This preferably happens as part of a request for setup of a direct communication connection. Alternatively this happens in a message sequence between first and second user equipment and back.

For evaluating the request the second user equipment needs to have available a list of valid authentication codes. The authentication code of the first user equipment was made available to all user equipments, at least those situated in the same or a neighboring security area of the first user equipment.

Hence only when the authentication code is known to the second user equipment, then the request can be approved. With the trust level one more evaluation step is added. In abnormal cases where the authentication code is not known for the second user equipment, or the trust level is too low, the requesting user equipment cannot be considered as trusted communication partner and will be treated accordingly.

Such treatment preferably means, that a direct communication connection is only setup for exchange of data that require no extra security level. Alternatively the receiving user equipment may receive messages from the first user equipment over the direct communication connection, but do not or not unconditionally follow instructions received with the messages, like braking in case of a vehicle that got an obstacle warning from an unreliable communication partner. The low trust level or unknown authentication code in this embodiment at least leads to a more careful handling of messages received from the untrusted user equipment.

Alternatively in that case no direct communication connection is set up at all. Obviously the decision about which of the treatment of the situation of a too low trust level and/or not known authentication code is up to the receiving user equipment and its security requirements.

The situation may change, when the second user equipment has access to the wireless network again. Then a request for checking validity of the authentication code is preferably made by the second user equipment.

In case the second user equipment indicates approval of the request, then the direct communication connection between both user equipment is resp. is capable to be established.

With this approach the receiver of a direct communication connection request is put into the position to evaluate if the requester is trustworthy, even though no way to access the wireless network is available.

In a preferred embodiment the trust level reduction is governed by a policy, provided by at least one of the wireless network or the security center.

With this embodiment it is assured that the user equipment is not allowed to arbitrarily set a desired trust level, but need to follow predetermined rules. A policy as such comprises a mandatory set of rules which need to be fulfilled by the user equipment Preferably the set of rules is checked as part of the approval process for usage of the user equipment production series in the wireless network.

Alternatively the set of rules is implemented in a preferably signed software module made available by the wireless network resp. the security center to the user equipment manufacturer. By this it is assured that the trust level is handled in a defined way and abusive behavior is prevented.

Additionally the wireless network might parameterize the trust level reduction according to network peculiarities. In particular in areas with larger coverage holes the reduction may be set to be slower than in denser areas.

Further the parametrization preferably takes into account other criteria. One criterion is preferably the type of user equipment, resp. in case of a vehicle where the user equipment is installed. As such for a privileged vehicle the trust level is reduced much slower—if any reduction is carried out at all—than for a normal car. Such privileged vehicles are in particular ambulances, police or army cars or fire brigade trucks, or the like official vehicles.

According to another preferred embodiment the reduction of trust level additionally considers at least one of
 moving speed of the user equipment,
 spatial relation to a cell area,
 measured network coverage conditions.

With this embodiment the trust level reduction is driven by more factors than only by time. These factors in particular relate to the situation resp. behavior of the user equipment.

With the moving speed of the user equipment the time factor is combined with a distance factor. That means taking account the moving speed, then even when the user equipment is comparably far away from the wireless network coverage it might still be reliable.

With the spatial relation to a cell area in particular the distance to a coverage areas is considered. When a user equipment appears far away from a coverage area, this might indicate a lower trust in its reliability.

With the measured wireless network coverage conditions in particular a couple of measurements are taken into account. This means that besides measurements of base stations of the wireless network also measurements of signals of other technology standards are preferably considered.

The geographical position evaluated via positioning sensors like GPS or other methods i.e. indicates the user equipment's location and allows checking against downloaded coverage maps. By doing so it can be determined that the user equipment is in an out-of-coverage area. Same conclusion could also be retrieved from information received from other user equipment i.e. also being out-of-coverage. When this is true for the requesting and the receiving user equipment, then a trust level matching to the found spatial situation is preferably rated as reliable. Other data from sensors resp. third party look-up data are preferably also taken into account.

In another preferred embodiment the trust level is maintained in a tamper resistant environment on board of the user equipment.

In this embodiment the user equipment is additionally equipped with a tamper resistant environment. This is in particular a—fixed or removable—secure element, or other hardware based secured environment. Alternatively a software based secured environment, like a sandbox or other embedded virtual machine like environment is used for it.

The tamper resistant environment preferably has the task to maintain the current value of the trust level. In an advantageous embodiment the tamper resistant environment also provides the algorithm for reducing the trust level according to said policy provided by the wireless network resp. security center. With this embodiment it is advantageously assured that no changes to the value or algorithm are carried out by unauthorized persons, or by fraud.

In a further advantageous embodiment it is proposed that in case the trust level is below a first predetermined threshold, the method comprises carrying out a renewal process of the trust level by accessing the security center via a second communication channel.

With this embodiment the situation is handled when the trust level is reduced that way, that it is prone for refusals of direct communication connection requests from receiving user equipments. As this would mean that the user equipment gets unable to setup a direct communication connection request, it is advantageous when the user equipment takes appropriate steps to overcome that situation.

Preferably the situation is triggered by a trust level reduction which leads to a new trust level value below the first predetermined threshold. The first predetermined threshold is preferably provided by the wireless network. Alternatively it takes into account the eligibility patterns of the receiving user equipments in order to avoid that the first user equipment receives rejections for direct communication connection requests due to the trust level. An amendment during runtime is therefore also encompassed by this embodiment.

According to this embodiment the user equipment is supposed to take steps for connecting to the security center. When the user equipment is again in the coverage area of the wireless network, then a simple access to a base station resp. to a security center via the then serving base station is sufficient to reset the trust level. The user equipment receives from the wireless network a confirmation response, which is in particular taken into account by the trust level policy, leading to an increase resp. setting to the maximum trust value.

In case the user equipment is not in a situation where it can exchange signals with a base station of the wireless network over the common channels, then it is according to this embodiment adapted to contact a service center by other means, that means by a second communication channel.

One option for such a second communication channel is to use an alternative carrier of another technology. This preferably encompasses Wifi, WiMax, fixed line or low power wide-area technologies (LPWAN). However this requires the capability of the user equipment to operate in these technologies. Usually another modem or at least components to support the respective channels need to be available.

Alternatively the user equipment tries to access a base station of the wireless network by means of coverage enhancement (CE). This is a modification of the known cellular technology standards where each signal is repeated for a couple of times, and the receiving user equipment accumulates the signals until sufficient power has been received for decoding the signals. This leads to an enhancement of the coverage of the base station, and thus might allow to communication with the respective user equipment. In particular in basements of building this technology helps reaching user equipments.

An alternative technology as part of cellular technology standards is the so-called sidelink. This is a method where a user equipment uses another user equipment for accessing a base station. The other user equipment is situated in the coverage area of the base station, and is in parallel supporting direct communication connections between the requesting user equipment and itself. The signals are then routed through the other user equipment to the base station. As this direct communication connection needs to be setup, here again the trust level is preferably considered. This in particular also relates to the other user equipment, as for routing data through a user equipment it also requires trust in this routing user equipment.

The trust level is not a binary value. Thus user equipments situated between said requesting user equipment and the coverage area should at least have the same or a higher trust level than the requesting user equipment. Hence when starting a renewal the user equipments used as "bridge" to the wireless network can reliably serve as remote entities when still having sufficient trust level. This might even relate to multiple user equipments in between.

When the attempt to access the wireless network for renewing the trust level is successful, the trust level is increased again. Preferably the trust level is set to the maximum level.

Otherwise the trust level is not renewed as long as no access to the wireless network resp. security center is possible.

Through applying the policy the trust level is further reducing when this situation continues.

Therefore it is proposed according to another preferred embodiment that in case the trust level is below a second predetermined threshold, the renewal process comprises requesting a new authentication code from a security center.

When the user equipment after passing the first predetermined threshold did not manage to renew the trust level, then the following trust level reduction will lead to a point until the trust level is so low that it is highly likely that other user equipments will refuse a direct communication connection.

Also the wireless network possibly considers that the user equipment has not contacted a base station resp. security center for a while. Preferably this might lead to a revocation of the authentication code.

To cope with this situation the second predetermined threshold is considered in this embodiment. When exceeding this second predetermined threshold the user equipment needs to renew the authentication code completely when it contacts the security center again. This is irrespective of the communication channel how the security center is accessed.

Hence, after the user equipment accesses the wireless network again, it needs to request a new authentication code. Upon reception of the new authentication code the trust level is set to the maximum value. The old authentication code is revoked latest now and the new authentication code is made available to the user equipments in the environment of the security center.

According to a preferred embodiment it is proposed a method wherein the second user equipment is maintaining a list of valid authentication codes, the method comprising the steps for the second user equipment upon reception, of the authentication code and the trust level from the first user equipment for setting up the direct communication connection, checking the authentication code with said list of valid authentication codes, and evaluating if the trust level matches a predetermined eligibility pattern, in case of a valid authentication code and trust level matches the eligibility pattern:
responding with a confirmation transmission to the first user equipment.

The second user equipment which receives a direct communication connection request from the first user equipment receives together with the authentication code the trust level of the authentication code. The second user equipment consequently has to decide if it accepts the direct communication connection request or not.

The second user equipment consequently evaluates the trust level according to eligibility patterns.

Such eligibility patterns in particular comprise in the straightforward approach a fixed threshold of a trust level. If the trust level is below the threshold, the direct communication connection request is rejected.

Preferably the threshold is adapted throughout runtime in order to increase or decrease it based on the experience, resp. by signals from the wireless network.

In an advantageous embodiment it is proposed that the eligibility pattern considers at least one of:
 a second trust level maintained by the second user equipment,
 a third trust level received from a third user equipment during a predetermined time before receiving the direct communication connection request,
 the distance to the cell area of a base station,
 the time of last access to one of the base stations of the wireless network.

This embodiment proposes a more elaborate eligibility pattern design.

According to the first option the trust level is compared to the trust level maintained by the second user equipment itself. This is in particular the trust level that is supposed to be used by the second user equipment for requesting a direct communication connection to another user equipment.

As the trust level from the first user equipment and of the second user equipment is governed by the same policy, the two user equipment are expected to have a comparable value of trust level when they traveled the same way since leaving the coverage area.

Hence, when the trust level of the requesting user equipment has a comparable value as the second user equipment, then the trust level —irrespective of the exact height—of the requesting user equipment seems consistent. It is therefore preferable to accept the request for direct communication.

The second option even enhances this finding, when the trust level of a third user equipment in proximity is taken into account. This is in particular available when the second and the third user equipment exchanged its trust level—e.g. as part of a direct communication connection—in a limited time period before receiving the request for direct communication connection from the first user equipment.

When all three user equipments have a similar trust level, then the trust level is judged to be reasonable.

However when the requesting user equipment has a way higher trust level than the second and third user equipment, then it is preferable to be suspicious.

In order to enhance the eligibility pattern further criteria are additionally taken into account, like the distance to a cell area of at least a base station or time since last access of base stations of the wireless network With the distance to cell areas in particular the case may be covered that the requesting user equipment just left the first cell area before sending the direct communication connection request, while the second (and third) user equipment left their second cell area a while ago and travel in the opposite direction. With the information that the first cell area is nearby, then the situation mentioned before, where the high trust level of the requesting user equipment appeared suspicious, is well explained.

The time of last access is useful for figuring out whether being in out-of-coverage or not. There may be reasons that a user equipment has not connected to the wireless network for a longer period of time i.e. when being temporarily not participating in the traffic or when being disconnected from power for a longer time.

This duration may exceed weeks or days hence a gradually reduction over time of the trust level is also sensible which forces the user equipment to undergo again its initial authentication procedure as available authentication code provide a too low trust level.

Preferably the decrease in trust level is not a linear function. The slope of reduction may decrease over time or have any other non-linear relation.

In another preferred embodiment the second user equipment is at least one of:
 a user equipment,
 an infrastructure equipment, using user equipment communication means.

With this embodiment the second user equipment is not necessarily alike the first user equipment. In particular it may be an infrastructure equipment like roadside equipment. Such roadside equipment is in particular connected via a landline to the security center resp. wireless network, in particular when no wireless coverage is available.

It nonetheless provides user equipment communication means, in particular for direct communication connections with other, in particular non-stationary user equipments, e.g. mounted on vehicles.

When receiving requests from non-stationary user equipments, then it is supposed to rate the trust level. In particular when the second user equipment is stationary, then it gets over time fine-tuned, in respect to what trust level is reliable and which is not.

Preferably when a non-trustable user equipment requests a direct communication connection, then the second user equipment uses its direct connection to report such behavior to the security center. In effect other user equipments will then get warned about such misbehavior.

According to the second aspect of the invention it is proposed a user equipment configured for operating with at least one of a plurality of base stations of a wireless network, and for operating with a second user equipment by means of a direct communication connection, the user equipment further maintaining an authentication code received from a first security center accessible via the wireless network, said first security center being assigned to a first area, for securing the direct communication connection, the user equipment is configured to:
 maintain a trust level of the authentication code,
 reduce the trust level relating to the time of last access to one of the base stations of the wireless network,
 submit to the second user equipment the authentication code and the trust level, for setting up the direct communication connection, in case of reception of a confirmation transmission from the second user equipment:
 set up the direct communication connection with the second user equipment.

The user equipment of the second aspect of the invention comprises receiving and transmitting circuitry, in particular in form of a transceiver, for wirelessly exchanging signals with a base station of the wireless network. The user equipment further comprises controlling circuitry, in particular for executing software for controlling the receiving and transmitting circuitry. Preferably the user equipment further comprises permanent and/or volatile memory, at least for storing the authentication code and the trust level.

Further the software executable for implementing a policy how to reduce the trust level is preferably stored in the memory and executed by the controlling circuitry.

In a preferred embodiment it is proposed a user equipment configured to maintain a list of valid authentication codes, and upon reception of the authentication code and the trust level from another user equipment for setting up the direct communication connection,
- to check the authentication code with said list of valid authentication codes, and
- to evaluate if the trust level matches a predetermined eligibility pattern, in case of a valid authentication code and trust level matches the eligibility pattern:
- to respond with a confirmation transmission to the other user equipment.

This embodiment proposes the capabilities of the user equipment when acting as second user equipment according to the inventive apparatus of the second aspect of the invention. Preferably each such user equipment is configured to act both as requester of a direct communication connection and as receiver of a direct communication connection request.

The user equipment according to this embodiment is configured to maintain a list of valid authentication codes. This is preferably carried out in the permanent memory. The content of the list of valid authentication codes is received via a serving base station of the wireless network from the security center. By this the user equipment is informed about which authentication codes are provided to user equipments which were found eligible to communicate in the wireless network and directly with other user equipments.

The list of valid authentication codes is regularly updated in order to assure that revoked authentication codes are removed in time, and newly assigned authentication codes are added.

When receiving a request for direct communication connection from another user equipment, the trust level is only evaluated when the authentication code delivered by the requesting user equipment is found in the list of valid authentication codes.

The trust level then is checked—alone or in combination with other criteria—if it matches the respective predetermined eligibility pattern in order to figure out, if the user equipment will accept the request for direct communication connection.

The second aspect of the invention shares the advantages of the first aspect.

As it is shown this invention advantageously solves the depicted problem and proposes a flexible method for setting up a secure direct communication connection between two user equipments, without accessing the wireless network before the connection is setup. The method does not reduce security and is applicable in particular for out-of-service situations, for which by now not solution was available.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows the situation of an exemplifying security area SA, for direct communication between user equipments UE1, UE2 located in said security area. The user equipments are furthermore configured to operate in a cellular wireless network CN, by means of camping on base stations eNB of the wireless network, when it is situated in the cell area CLA of the respective base station.

Figure 1:
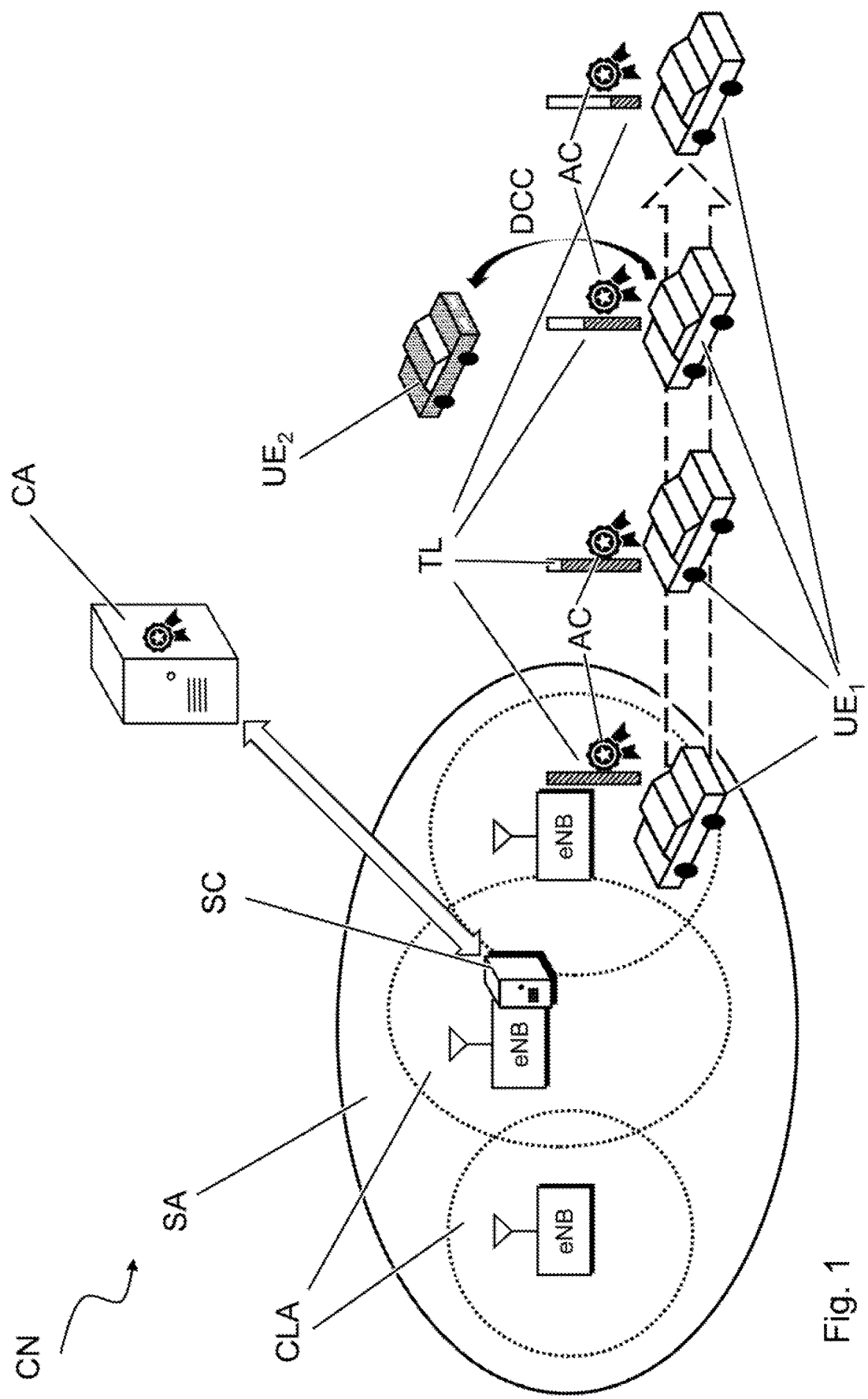
FIG. 1 represents an exemplifying scenario where the inventive concept is applied to as an embodiment.

At least one of the user equipments involved in the direct communication is placed on a moving vessel, in particular a vehicle. In the shown exemplifying embodiment the user equipments UE1, UE2 are all placed on vehicles.

The direct communication connection DCC is a wireless communication where the communication link is directly established between the two user equipments. That means, the direct communication connection differs e.g. from a regular phone call between two wireless handsets, which can be situated anywhere, where the communication link is in reality happening between the user equipment and the serving base station of the cell where the user equipment is currently operating in, then through a routing inside the one or more involved wireless networks and finally between the user equipment which is the communication endpoint and its serving base station.

For the direct communication connection the user equipments are generally using their credentials of the wireless network, in particular provided by means of a subscriber identification card, in order to authenticate towards the other user equipment. However as such authentication is prone to tracking the owner of the user equipments when moving, and additionally requires lengthy interaction with the serving base station this embodiment of the inventive method is designed to solve that issue. Moreover the credentials can only be checked by the help of the wireless network, when the user equipments are located in the coverage area CLA of a base station eNB of the wireless network CN.

The security area SA of the wireless network CN is equipped with a service center SC. Preferably the service centers are installed with a base station eNB of the wireless network that is situated within the security area, or in other connection to wireless network components. By such architecture the service center SC is accessible for the user equipments via their serving base stations. Furthermore the service center SC is configured to communicate with a certificate authority CA, which is supposed to provide on request valid authentication codes like certificates, which can be used to sign communication messages. For the sake of simplicity in this embodiment it is used a certificate throughout the rest of the exemplifying embodiment.

Typically the access to the certificate authority is provided by means of wireless network lines.

Before one user equipment UE1 wants to establish a connection to another user equipment UE2 it has to request a certificate from the security center SC responsible for the security area SA, where the current serving base station of user equipment UE1 is located. The security area SA preferably comprises a plurality of cell areas CLA of base stations eNB.

Preferably the received certificate is unique to the security area. However the certificate is bound to be valid for said security area SA.

In that sense when a user equipment UE1 is trying to setup a connection to user equipment UE2, then the certificate is provided with the connection request. The user equipment UE2 has the possibility to figure out if the certificate is valid for this security area by checking if the certificate is part of the list of valid certificates for the security area provided by the service center SC.

This check is preferably done by checking against a downloaded list of valid certificates (resp. an identification of the certificates). Alternatively the user equipment sends a validity check request to the security center SC with a representation of the received certificate, and gets in response an indication if the certificate is valid.

This exercise is preferably carried out between two vehicles equipped with direct communication link capable communication equipment. Such communication request preferably relates to brake warning, or other communication for making possible an autonomously driving car. Alternatively the second user equipment is a fixed equipment, like a beacon, traffic light, speed signs or other street furniture.

The invention becomes particularly important when the user equipment UE1 is moving outside of the coverage areas CLA of the wireless network CN. This scenario requires a special solution as the user equipment UE2—also situated outside of a coverage area—has no ways to check, if the requesting user equipment UE has a valid authentication code resp. certificate, or if—e.g. due to abuse—the certificate has meanwhile been revoked by the certificate authority CA. Would the user equipment UE2 still operate in the coverage area CLA of the wireless network, then the respective security center would have sent an indication including the revocation. With that the user equipments would be put in the position to update its list of valid authentication codes.

For the out-of-coverage situation other solutions needed to be found. To disallow direct communication connections in out-of-coverage areas would be a too strong limitation, and massively reduce the use of technologies like device-to-device communication, autonomous driving etc.

With the exemplary embodiment of the inventive solution as shown here this situation is overcome. The user equipment UE1 maintains besides the certificate AC also a trust level TL. This is in particular advantageous for all user equipments which are configured to setup a direct communication connection.

As indicated in FIG. 1 the trust level is reduced when the user equipment leaves the coverage area. Preferably the reduction of the trust level is a function of time since last access to a base station, resp. a security center. Alternatively or additionally other factors are further taken into account.

When the user equipment UE1 then tries to setup a direct communication connection to user equipment UE2, the certificate AC and the actual value of the trust level is submitted with resp. in conjunction with the request for direct communication connection.

Preferably the trust level handling is carried out in a secured environment of the user equipment UE1. In one embodiment this is operating according to a policy, e.g. provided by the network operator. That means, if the user equipment would not reduce the trust level accordingly, it would not have got the approval for operation in the wireless network.

Alternatively a signed software module is provided by the network operator and executed by the user equipment. Further well known security measures are available to assure that a reliable trust level is made available to the receiver of the request for direct communication connection.

Figure 2:
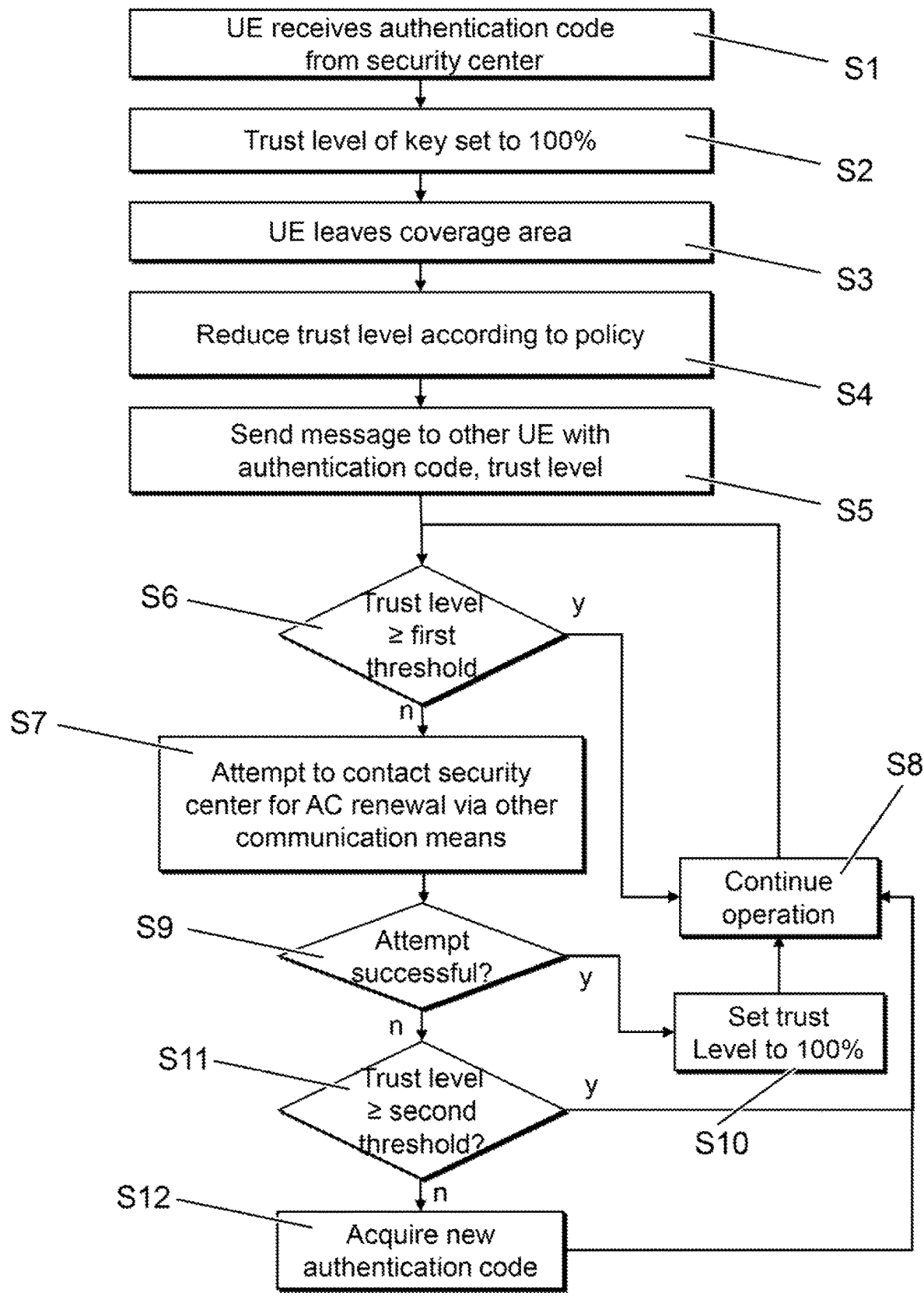
FIG. 2 represents an flow chart according to a preferred embodiment of the invention.

In FIG. 2 the workflow is shown in another exemplifying embodiment. It starts in step S1 with the user equipment UE that receives from the security center SC resp. the attached certificate authority CA an authentication code AC, in particular a certificate.

The user equipment UE as described before maintains a trust level TL. The trust level is supposed to depict the trust in the authentication code. Consequently, when the authentication code is just freshly received from the security center, the trust level is set to the value indicating maximal trust, as shown in step S2 to 100%.

In step S3 the user equipment is leaving the coverage area of the wireless network. This is in particular true in densely populated areas, or other bad reception areas, like some indoor conditions. With this movement the situation relating to the trust level is changed. For the following steps it is assumed that the out-of-coverage situation is still valid.

In step S4 therefore the trust level is reduced according to a predetermined policy. The policy is a set of rules, wherein the trust level reduction is in this exemplifying embodiment based on time since last contact to the security center resp. a base station of the wireless network. The amount of reduction in is in particular implementation specific, but is preferably synchronized. That means two user equipments leaving the coverage area at the same time and moving the same time and distance etc. should have approximately the same trust level at each moment since leaving the coverage area.

In step S5 the user equipment plans to set up a direct communication connection with another user equipment in proximity. For that the first user equipment sends a message at least with the two parameters: authentication code and value of the trust level.

The receiving user equipment then has to decide if the trust level is sufficient or not to rely the authentication code. This relates to the eligibility pattern the receiving user equipment is applying. When the receiving user equipment accepts the request, that means finds the trust level to indicate sufficient reliability, then the direct communication connection is setup.

Not necessarily depending upon the outcome, the sending user equipment further evaluates its trust level, which is started with the decision point S6. The user equipment preferably maintains two thresholds. In S6 it is checked if the trust level is above the predetermined first threshold. This first threshold depicts the first checkpoint for handling the threshold. In particular when the user equipment is planning to setup a direct communication connection soon, the value of the first threshold could mean that a receiving user equipment might not accept a direct communication connection request.

When the trust level is equal to or above the first threshold, the operation continues with step S8. Afterwards non-displayed steps might be carried out, before the user equipment preferably after some time again checks in step S6 the trust level against the first threshold.

When the trust level is below the first threshold, then the flow branches to step S7. This means, the next direct communication connection might fail, due to a too low trust level.

In order to solve that issue, that user equipment then tries other communication means to reach a security center and consequently increase the trust level again.

Such other communication means might include using another network type, like Wifi, Wimax, fixed line, in case the user equipment provides the capabilities. Alternatively other modes of operation are used within the cellular communication capabilities. This includes a coverage enhancement usage or sidelink operation, which includes by means of another device which provides better connectivity to the wireless network, the user equipment accesses the security center. Such other device might also encompass infrastructure elements, roadside equipment etc.

In step S9 it is checked if it was possible to update the trust level in response to an access to a security center. If so the flow branches to step S10, and the trust level is increased, in particular again set to 100%, and the operation continues in step S8

If not then the trust level is further decreasing over time. Hence in step S11 it is checked if the trust level is below a second threshold. If not then operation continues in step S8. Otherwise the user equipment is supposed to acquire a new authentication code, as soon as a wireless network connection is available.

For the user equipment this in particular means, that before the security center cannot be reached, a direct communication connection will not be possible.

Preferably from wireless network side when the user equipment did not contact for a given time the provided authentication code is then revoked upfront.

With the new authentication code, the user equipment is then starting anew, alike the step described for step S1.

In FIG. 3 it is described the way the receiving user equipment is handling a direct communication request comprising a trust level, according to a preferred exemplifying embodiment.

Here three scenarios are suggested that illustrate advantageous implementations of the applied eligibility patterns.

The trivial way of evaluating the trust level are fixed thresholds, as used by the first user equipments for trust level resp. authentication code renewal as well. Here are shown more elaborate strategies.

Figure 3A:
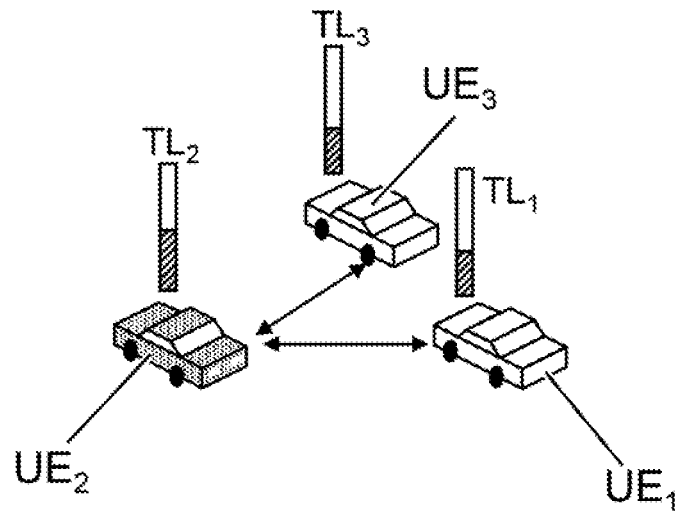
FIG. 3a-c shows three exemplifying scenarios of eligibility patterns.

The first is indicated by FIG. 3a. Receiving user equipment UE2 receives a message from requesting user equipment UE1. The trust level TL1 provided by the requesting user equipment UE1 is comparably low. Instead of comparing with a fixed threshold the receiving user equipment UE2 compares the trust level TL1 with its own trust level TL2.

This strategy has the background, that both user equipments have supposedly traveled a similar way since being in reach of a wireless networks base station. Consequently the trust level has been decreased in the same way.

Hence when the received trust level TL1 and the own trust level TL2 do not differ above a preferably percentage, then the trust level matches this eligibility pattern.

Preferably this result is further reconfirmed by checking the trust level TL3 of at least one additional user equipment UE3, provided this is available or can be requested by the receiving user equipment UE2. In case there is no remarkable deviation between the trust levels TL1 and TL3, then the trust level is acknowledged as being reliable.

Figure 3B:
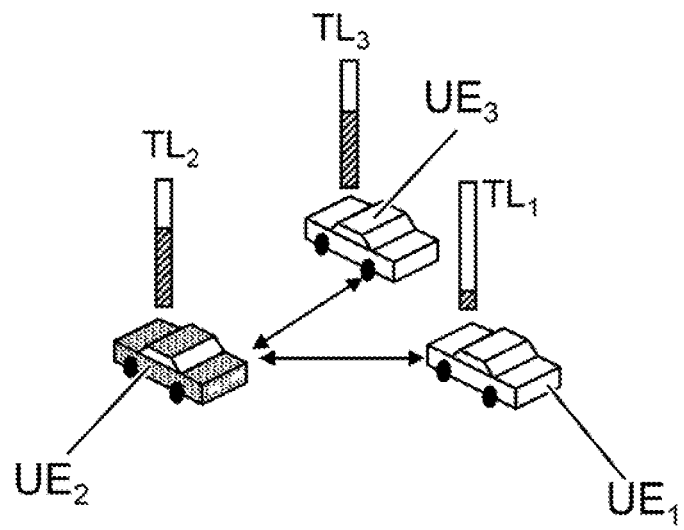

In FIG. 3b the situation is shown that the requesting user equipment UE1 has a way lower trust level TL1 than the trust levels TL2 and TL3 of the receiving user equipment UE2 and the additional user equipment UE3. This situation means that the user equipment is already traveling longer than the receiving user equipment around and is therefore less reliable. Eventually the receiving user equipment UE2 would reject the direct communication request from user equipment UE1.

Figure 3C:
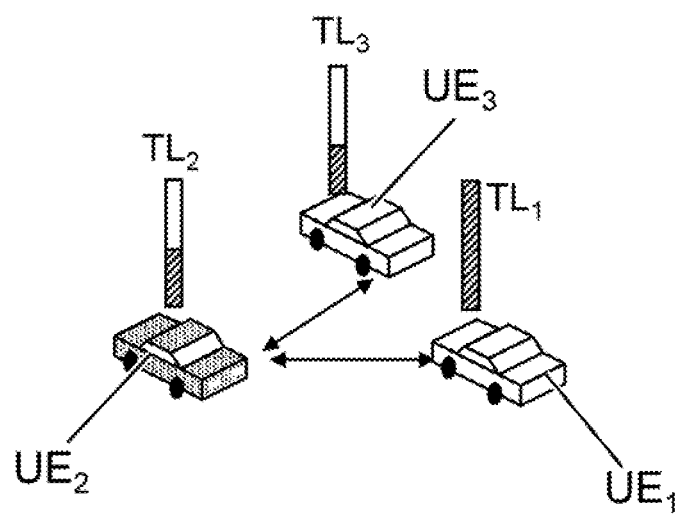

In FIG. 3c it is depicted a situation that shows that elaborate eligibility pattern are paramount over the simple approach with fixed thresholds. Here the receiving user equipment receives a request with a high trust level TL1, in this case even 100%. Normally this would mean, that the sending user equipment UE1 just contacted the wireless network and updated the trust level or freshly received the authentication code.

However, when comparing the received trust level TL1 with its own trust level TL2 and/or the trust level TL3 of the additional user equipment UE3, doubts are allowed. The receiving user equipment UE2 has a remarkably reduced trust level TL2 due to the fact that it is operating in out-of-coverage situation for a while now, and this is reconfirmed by the trust level TL3 of the additional user equipment UE3. Hence, no access to the wireless network is available around. Then, there are doubts allowed how the requesting user equipment UE1 manages to have such a high trust level as shown.

In this case the receiving user equipment would also reject the direct communication connection request, as it is highly likely that the requester shows an abusive behavior. Preferably upon next connection the receiving user equipment would report such behavior to the wireless network and/or to additional user equipments around.

More eligibility pattern are possible and encompassed by the invention, in particular when taking into account a reduction of the trust level not only related to the time since last access to the wireless network.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments. In addition, it is to be understood that the location or arrangement of individual elements within each disclosed embodiment may be modified. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for securing a direct communication connection between a first and a second user equipment, both configured to operate with at least one of a plurality of base stations of a wireless network, the method comprising the steps for the first user equipment of:
   maintaining an authentication code received from a first security center accessible via the wireless network, said first security center being assigned to a first area, said authentication code being made available to at least all user equipment in the first area,
   maintaining a trust level of the authentication code,
   reducing the trust level relating to the time of last access to one of the base stations of the wireless network,
   submitting to the second user equipment the authentication code and the trust level, for setting up the direct communication connection,
   in case of reception of a confirmation transmission from the second user equipment:
   setting up the direct communication connection with the second user equipment.

2. Method according to claim 1, wherein the trust level reduction considers the last access to the first security center by means of the base station.

3. Method according to claim 1, wherein the trust level reduction is governed by a policy, provided by at least one of the wireless network or the security center.

4. Method according to claim 1, wherein the trust level is maintained in a tamper resistant environment on board of the user equipment.

5. Method according to claim 1, wherein in case the trust level is below a first predetermined threshold, the method comprises carrying out a renewal process of the trust level by accessing the security center via a second communication channel.

6. Method according to claim 1, wherein in case the trust level is below a second predetermined threshold, the renewal process comprises requesting a new authentication code from a security center.

7. Method according to claim 1, wherein the reduction of trust level additionally considers at least one of
moving speed of the user equipment,
spatial relation to a cell area,
measured network coverage conditions.

8. Method according to claim 1,
the second user equipment maintaining a list of valid authentication codes,
the method comprising the steps for the second user equipment upon reception, of the authentication code and the trust level from the first user equipment for setting up the direct communication connection,
checking the authentication code with said list of valid authentication codes, and
evaluating if the trust level matches a predetermined eligibility pattern, in case of a valid authentication code and trust level matches the eligibility pattern:
responding with a confirmation transmission to the first user equipment.

9. Method according to claim 8, wherein the eligibility pattern considers at least one of:
a second trust level maintained by the second user equipment,
a third trust level received from a third user equipment during a predetermined time before receiving the direct communication connection request,
the distance to the cell area of a base station,
the time of last access to one of the base stations of the wireless network.

10. Method according to claim 8, wherein the second user equipment is at least one of:
a user equipment,
an infrastructure equipment, using user equipment communication means.

11. User equipment configured for operating with at least one of a plurality of base stations of a wireless network, and for operating with a second user equipment by means of a direct communication connection,
the user equipment further maintaining an authentication code received from a first security center accessible via the wireless network, said first security center being assigned to a first area, said authentication code being made available at least to all user equipment in the first area, for securing the direct communication connection, the user equipment is configured to:
maintain a trust level of the authentication code,
reduce the trust level relating to the time of last access to one of the base stations of the wireless network,
submit to the second user equipment the authentication code and the trust level, for setting up the direct communication connection,
in case of reception of a confirmation transmission from the second user equipment:
set up the direct communication connection with the second user equipment.

12. User equipment according to claim 11, wherein the trust level reduction is governed by a policy, provided by at least one of the wireless network or the security center.

13. User equipment according to claim 11, further comprising a tamper resistant environment, wherein the trust level is maintained in said tamper resistant environment.

14. User equipment according to claim 11, configured to maintain a list of valid authentication codes, and upon reception of the authentication code and the trust level from another user equipment for setting up the direct communication connection,
to check the authentication code with said list of valid authentication codes, and
to evaluate if the trust level matches a predetermined eligibility pattern, in case of a valid authentication code and trust level matches the eligibility pattern:
to respond with a confirmation transmission to the other user equipment.

15. User equipment according to claim 14, wherein the eligibility pattern considers at least one of:
a second trust level maintained by the user equipment,
a third trust level received from a third user equipment during a predetermined time before receiving the direct communication connection request,
the distance to the cell area of a base station,
the time of last access to one of the base stations of the wireless network.

* * * * *